United States Patent [19]

Ueno et al.

[11] Patent Number: 4,999,141
[45] Date of Patent: Mar. 12, 1991

[54] MANUFACTURING METHOD FOR PLASTIC OPTICAL FIBER

[75] Inventors: Keiji Ueno, Osaka; Haruo Saen, Tochigi, both of Japan

[73] Assignee: Sumitomo Electric Industries, Ltd., Osaka, Japan

[21] Appl. No.: 335,409

[22] Filed: Apr. 10, 1989

Related U.S. Application Data

[63] Continuation-in-part of Ser. No. 108,441, Oct. 15, 1987, abandoned.

[30] Foreign Application Priority Data

Oct. 15, 1986 [JP] Japan .............................. 61-246268

[51] Int. Cl.$^5$ .............................................. B29D 11/00
[52] U.S. Cl. ...................................... 264/1.4; 264/1.5
[58] Field of Search ................................ 264/1.5, 1.4; 350/96.34

[56] References Cited

U.S. PATENT DOCUMENTS

| | | | |
|---|---|---|---|
| 4,161,500 | 7/1979 | Schleinitz et al. | 264/1.5 |
| 4,541,979 | 9/1985 | Cooke et al. | 264/1.5 |
| 4,564,263 | 11/1986 | Ueba et al. | 264/1.5 |
| 4,708,833 | 11/1987 | Ohsawa et al. | 264/1.5 |

*Primary Examiner*—James Lowe
*Attorney, Agent, or Firm*—Cushman, Darby & Cushman

[57] ABSTRACT

The present invention provides a method of manufacturing an optical fiber of high heat-resisting and light-receiving properties as well as greater flexibility. The optical fiber of the present invention comprises a core made of a setting type transparent silicone rubber, and an outer portion made of a high molecular weight transparent substance whose refractive index is at least 0.02 less than that of the core. Silicon rubber is injected into the cylindrical outer portion and set, and the silicone rubber and the outer portion are thereafter subjected to heat treatment at a temperature of 120° C. or more for at least 1 hour.

4 Claims, No Drawings

4,999,141

MANUFACTURING METHOD FOR PLASTIC OPTICAL FIBER

This is a continuation-in-part (CIP) of Pat. application Ser. No. 07/108,441, filed Oct. 15, 1987, which was abandoned upon the filing hereof.

FIELD OF THE INVENTION

The present invention relates to a method of manufacturing a plastic optical fiber, in particular a plastic optical fiber that exhibits high heat resistance and flexibility.

DESCRIPTION OF THE PRIOR ART

The utilization of an optical fiber consisting of a quartz core has recently found applications in the field of communication. More recently, an optical fiber made of a plastic core has been used for optical communication through short distances, and various machines have been developed to facilitate such optical communication. Since the weight and cost of the plastic optical fiber is low, the fiber is expected to have applications in many fields, particularly in the area of motor vehicles.

An acrylic resin of high transparency is used as the core of the plastic optical fiber. Among such acrylic resins, polymethyl methacrylate has greater transparency and good processing properties so that the polymethyl methacrylate is often used as the core of the plastic optical fiber.

However, the heat resisting properties and flexibility of a conventional optical fiber made of a polymethyl methacrylate core are not high enough to be used for motor vehicles, because the temperature around the engine thereof is high and the disposition of the optical fiber around the engine is complex. Usually, the maximum temperature for the use of a conventional optical fiber is 80° C. Even the maximum temperature for the use of such a conventional optical fiber of greater heat-resisting properties is only 120° C., and although, the flexibility of a conventional optical fiber is not as low as that of an optical fiber made of a quartz core, the conventional optical fiber is not flexible enough to be easily disposed within the motor vehicle.

Studies were made in order to solve the above-mentioned problems. As a result, an optical fiber of high heat-resisting properties and flexibility was developed with a core of a room temperature-setting transparent silicone rubber and the use of an outer portion of a high molecular weight fluoric substance whose refractive index is at least 0.02 less than that of the silicone rubber.

However, when the optical fiber was used for a photosensitizer, the light-receiving properties were affected and the optical fiber was rendered unstable. Therefore, another problem that has been encountered with such an optical fiber is that it is difficult to put the optical fiber into practical use.

SUMMARY OF THE INVENTION

Accordingly, it is an object of the present invention to provide a method of manufacturing an optical fiber of high heat resistance and light receiving properties as well as greater flexibility.

DETAILED DESCRIPTION OF THE INVENTION

The optical fiber manufactured by a method according to the present invention comprises a core made of a room temperature-setting transparent silicone rubber, and an outer portion made of a high molecular weight transparent substance whose refractive index is at least 0.02 less than that of the core. The method is characterized in that the silicone rubber is injected into the cylindrical inner portion and set, and the silicone rubber and the inner portion are thereafter subjected to heat treatment at a temperature of 120° C. or more for at least 1 hour.

Silicone rubber is available as a high molecular weight transparent substance of high heat-resisting properties and flexibility to make a core. Among such silicone rubbers, the room temperature-setting silicone rubber has greater transparency. Although the refractive index of the silicone rubber is usually 1.40, the refractive index can be increased to 1.45, for example, by introducing a phenyl group into the silicone rubber.

The room temperature-setting silicone rubbers, in particular Shin-etsu Silicon (RTV KE 103) which is produced by the Shin-etsu Chemical Co., Ltd. can be used to make the core of an optical fiber. Silicone rubber RTV KE 103 is a composition of divinyl(dimethylpolysiloxane)/vinyltrimethoxysilane.

According to the present invention, the room temperature-setting silicone rubber is injected into the inner portion cylindrically formed beforehand and is then set to make the optical fiber. According to the principle of transmission of light for an optical fiber, any substance whose refractive index is less than that of the core can be used to make the outer portion. However, a substance whose refractive index is at least 0.02 less than that of the core should preferably be used to make the outer portion to enhance the light transmitting properties of the optical fiber. From a viewpoint of heat resistance, it is preferable to use a high molecular weight fluoric substance such as a polyvinylidene fluoride (refractive index = 1.38) and a tetrafluoroethylene hexafluoropropylene copolymer (refractive index = 1.34) to make the outer portion.

Since the heat treatment is performed at a temperature of 120° C. or more for at least 1 hour, fluctuation in the intensity of light received through the optical fiber is greatly reduced, to 0.1 to 0.3 dB per 3 m. If the temperature of heat treatment is lower than 120° C. or the time of treatment is shorter than 1 hour, the intensity of the received light cannot be stabilized sufficiently.

When an optical fiber is manufactured by this method, but not subjected to heat treatment, and is used for a photosensor, the intensity of light at a light-receiving section fluctuated by as much as 1 to 5 dB per 3 m. Therefore, the optical fiber could not be used for the photosensor.

When various improvements were made in the refinement of the silicone rubber for the optical fiber, the selection of the substance for the outer portion of the optical fiber, and so forth, it was found that the transparency of the optical fiber could be enhanced, but the stability of the intensity of light at the light-receiving section could not be enhanced.

The method of manufacturing the plastic optical fiber includes (1) a core made of a setting type transparent silicone rubber and (2) an outer portion made of a high molecular weight substance whose refractive index is at least 0.02 less than that of the core comprising the steps of:

(a) injecting silicone rubber for the core into the cylindrical outer portion;

(b) setting the injected silicone rubber; and (c) heat treating the core and the outer portion at a temperature of 120° C. or greater for at least one hour.

The particular procedure for forming the core and the outer portion can be performed in any apparatus and procedure known to those skilled in the art. The clad tube can be made by a melt extrusion method using a screw type extruder. In one embodiment of the invention, the flatness of the inside of the tube is such that the extrusion temperature (250°–350° C.) and line speed (10–50 m/min) do not generate a melt fracture.

An embodiment of the present invention is hereafter described in detail.

EXAMPLE 1

Shin-etsu Silicone (RTV KE 103), which is commercially produced by the Shin-etsu Chemical Co., Ltd., was used to make the core of an optical fiber. A tetrafluoroethylene hexafluoropropylene copolymer was used to make the outer portion of the optical fiber. After the substance for making the core was injected into the outer portion of 1.6 mm in outside diameter and 1.0 mm in the inside diameter, the substance and the outer portion were kept at the room temperature for 24 hours so that the substance was set, thus producing the optical fiber. The optical fiber was then subjected to heat treatment in which the optical fiber was kept at a temperature of 140° C. for 24 hours.

When the optical fiber was used for a photosensor, the stability of the intensity of light of 850 nm in wavelength at a light-receiving section was measured to be such that the fluctuation in the intensity was 0.1 to 0.2 dB per 3m.

After the optical fiber was kept at a temperature of 150° C. for a time of 7 days after the heat treatment, the form of the optical fiber was found unchanged.

COMPARATIVE SAMPLE 1

An optical fiber, which had an outside diameter of 1.6 mm and a core and an outer portion made of Shin-etsu Silicone (RTV KE 103) and the tetrafluoroethylene hexafluoropropylene copolymer, respectively, was manufactured in the same manner as in the embodiment, but not subjected to the heat treatment. When the optical fiber was used for a photosensor, the stability of the intensity of light of 850 nm in wavelength at a light-receiving section was measured to be such that the fluctuation in the intensity was as much as 2 to 4 dB per 3 m. Accordingly, it was found out that the optical fiber produced could not be put into practical use as a photosensor.

EXAMPLE 2

The same optical fiber as that of Example 1 except that the optical fiber was subjected to the heat treatment at a temperature of 120° C. for 24 hours, was prepared. This optical fiber showed the same properties as that of Example 1.

COMPARATIVE SAMPLE 2

The same optical fiber as that of Comparative Sample 1 except that the optical fiber was subjected to the heat treatment at 100° C. for 24 hours, was prepared. When the optical fiber was used for a photosensor, the stability of the intensity of light of 850 nm in wavelength at a light-receiving section was measured to be such that the fluctuation in the intensity was as much as 2 to 4 dB per 3 m. Accordingly, it was found that also this optical fiber could not be put into practical use as a photosensor.

EXAMPLE 3

The same optical fiber as that of Example 1 except that the substance injected into the outer portion was set by electron beam irradiation having the energy of 1 Mev and the amount of 20 Mrad, was prepared. The optical fiber also showed the same properties as that of Example 1.

While the present invention has been illustrated by detailed descriptions of preferred embodiments thereof, it will be obvious to those skilled in the art that various changes in form and detail can be made therein without departing from the true scope of the invention. For that reason, the invention must be measured by the claims appended hereto.

We claim:

1. A method of manufacturing a plastic optical fiber including (1) a core made of a setting type transparent silicone rubber and (2) a cyindrical outer portion made of a high molecular weight substance whose refractive index is at least 0.02 less than that of the core, comprising the steps of:
    a) injecting the silicone rubber for the core into the cylindrical outer portion;
    b) setting the injected silicone rubber at room temperature; and
    c) heating the core and the outer portion at a temperature of 120° C. or greater for at least one hour to stabilize the light receiving properties of the optical fiber.

2. A method according to claim 1, wherein the high molecular weight substance for the outer portion of the optical fiber contains at least one fluorine atom in each repeating unit of the polymer.

3. A method according to claim 1, wherein the injected silicone rubber is set by electron beam irradiation.

4. A method according to claim 1 wherein the silicone rubber is set at room temperature.

* * * * *